United States Patent [19]
Shimizu

[11] Patent Number: 4,962,910
[45] Date of Patent: Oct. 16, 1990

[54] DEVICE FOR USE TO PREVENT HUMAN SKIN FROM EXCESSIVE SUNBURNS

[75] Inventor: Atsuko Shimizu, Akishima, Japan

[73] Assignee: Casio Computer Co., Ltd., Tokyo, Japan

[21] Appl. No.: 320,709

[22] Filed: Mar. 8, 1989

[30] Foreign Application Priority Data

Mar. 14, 1988 [JP] Japan .................................. 63-59986

[51] Int. Cl.⁵ .............................................. G01J 1/44
[52] U.S. Cl. ...................................... 250/372; 340/600
[58] Field of Search .......................... 250/372; 340/600

[56] References Cited

U.S. PATENT DOCUMENTS

| | | | |
|---|---|---|---|
| 3,917,948 | 11/1975 | Strutz | 250/372 |
| 4,428,050 | 1/1984 | Pellegrino et al. | 250/372 |
| 4,535,244 | 8/1985 | Burnham | 250/372 |
| 4,644,165 | 2/1987 | Ross et al. | 250/372 |
| 4,704,535 | 11/1987 | Leber et al. | 250/372 |
| 4,851,686 | 7/1989 | Pearson | 250/372 |

Primary Examiner—Carolyn E. Fields
Attorney, Agent, or Firm—Frishauf, Holtz, Goodman & Woodward

[57] ABSTRACT

In a device for use to prevent skin from sunburns according to the present invention, critical values concerning sunburns corresponding to a plurality of Sun Protection Factor values are displayed upon inputting of a user's skin-type data. Accumulative ultraviolet-radiation doses as measured over predetermined time intervals are compared with the critical values concerning sunburns corresponding to the above mentioned Sun Protection Factor values. Alarm sounds are activated calling the user's attention to prevent his or her skin from sunburns, every time each of the critical values coincides with the measured radiation doses.

20 Claims, 4 Drawing Sheets

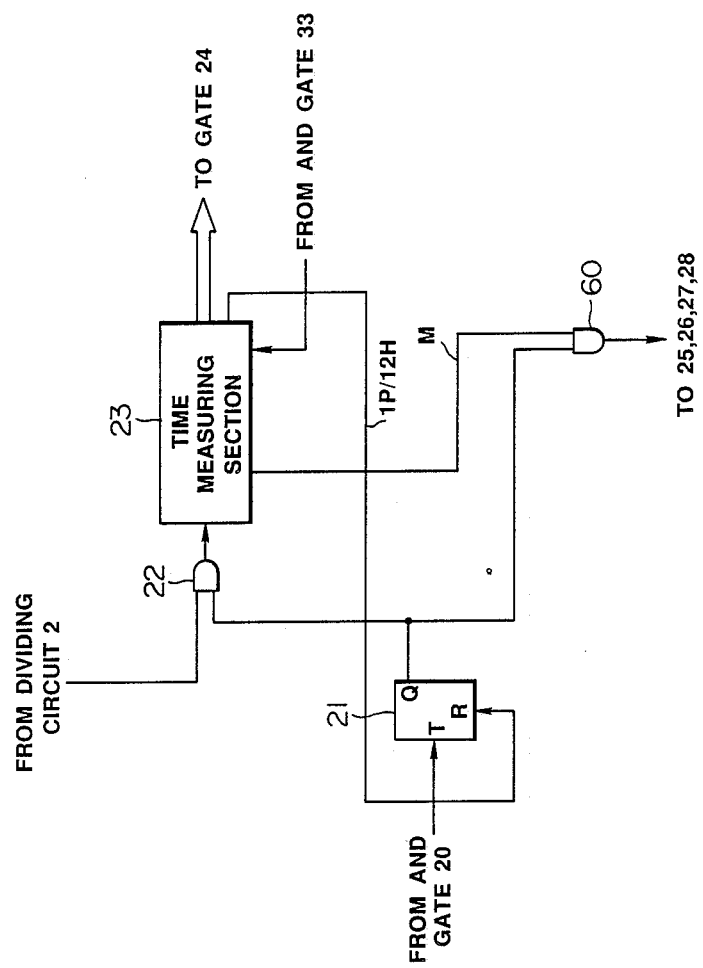
FIG.5
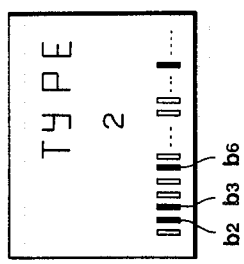
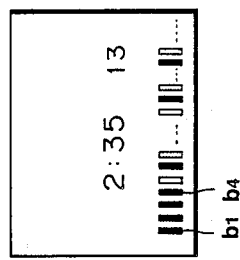
FIG.4A  FIG.4B  FIG.4C

DEVICE FOR USE TO PREVENT HUMAN SKIN FROM EXCESSIVE SUNBURNS

BACKGROUND OF THE INVENTION

The present invention relates to a device for use to prevent human skin from an excessive sunburn caused by ultraviolet radiation.

In general, sunscreen materials such as sun creams, sun oils, sun shades and the like are used to apply to human skin in order to protect the skin from an excessive sunburn caused by ultraviolet radiation. Meanwhile, devices have been proposed which measure a dose of ultraviolet radiation to give an alarm warning the user of an excessive sunburn to her or his skin. This type of the device, for example as described in the specification of U.S. Pat. No. 3,917,948, is used to measure and accumulate the radiation dose of ultraviolet radiation, and to activate an alarm warning the user that the accumulative total has approached or has reached a predetermined radiation dose which may cause sunburns to her or his skin.

On the other hand, various kinds of sunscreen materials such as sun creams, sun oils, sun shades and the like, have been available on the market, which have different indexes indicating an effect for protecting skin from ultraviolet radiation, or the sun protection factor (SPF) values. The sunscreen materials having different SPF values have different skin protection effects i.e. the difference in the SPF values of the sunscreen materials applied to human skins means that total doses of ultraviolet radiation which may cause sunburns to the skins to the same degree are different. The total doses of ultraviolet radiation which may cause sunburns to skins to the same degree depend upon sensitivities of the skins to ultraviolet radiation. Accordingly, the sensitivity of human skin to ultraviolet radiation will be one of the important factors. Human skin is classified into six groups or types depending on the skin sensitivities to ultraviolet radiation and the human skin classification is set forth in Table 1, e.g. ranging from the type I skin having the poorest resistance to ultraviolet radiation to the type VI skin having the highest resistance to ultraviolet radiation.

TABLE 1

| SKIN TYPE | DESCRIPTION |
| --- | --- |
| I | Fair skin<br>Always burns easily<br>Never tans |
| II | Fair skin<br>Always burns easily<br>Tans minimally |
| III | Light brown skin<br>Burns moderately<br>Tans gradually |
| IV | Moderate brown skin<br>Burns minimally<br>Always tans well |
| V | Dark brown skin<br>Rarely burns<br>Tans profusely |
| VI | Dark brown skin<br>Never burns<br>Deeply pigmented |

In Table 2 is set out ultraviolet radiation doses versus each SPF value. Table 2 shows how many times of ultraviolet radiation dose of SPF value "1" can cause sunburns to human skins of various types from I to VI to which no sunscreen material is applied, provided that the ultraviolet radiation dose in "7J/cm$^2$" which causes a sunburn to the human skin of type I with no sunscreen material being applied is expressed by the SPF value "1".

TABLE 2

| Type | SPF 7J/cm$^2$ = 1 | | | | |
| --- | --- | --- | --- | --- | --- |
| | 1 (no sunscreen) | 2 | 4 | 8 | 15 |
| I | 1 | 2 | 4 | 8 | 15 |
| II | 2 | 3 | 6 | 12 | 23 |
| III | 2 | 4 | 8 | 16 | 30 |
| IV | 3 | 5 | 10 | 20 | 30 or above |
| V | 4 | 8 | 16 | 30 or above | 30 or above |
| VI | 8 | 16 | 30 or above | 30 or above | 30 or above |

For example, Table 2 indicates that if a sun cream of SPF value "2" is applied to human skin of type I, the ultraviolet radiation dose which can cause sunburns to the above human skin is given by "2", and even though the same sun cream of SPF value "2" is applied to the human skin of type VI, the ultraviolet radiation dose which can cause sunburns to the human skin will be "16", wherein both the ultraviolet radiation doses differ by 8 times. The human skin of type III, to which the sunscreen material of SPF value "1" or no sunscreen material is applied gets sunburnt with an ultraviolet radiation dose of value "2" and the same skin of type III to which the sunscreen material of SPF value "15" is applied gets sunburnt with ultraviolet radiation dose of value "30", as set forth in Table 2. The later is 15 times the former in ultraviolet radiation dose. As above described, the ultraviolet radiation dose which can cause sunburns to skin differs greatly depending upon the types of human skin and the SPF values of the sunscreen materials. In order to surely alarm the user of the above mentioned device to prevent the skin from an excessive sunburn, the SPF value of the sunscreen material applied to the skin and the type of the skin are needed to input to the device. Therefore, a device has been proposed, in which the SPF value of the sunscreen material to be used and the type of skin can be input thereto and an alarm sound is generated at the time the skin has received the ultraviolet radiation dose defined by the SPF value and the skin type. For example, in the specification of U.S. Pat. No. 4,535,244 is described a warning device in which the SPF values of sun creams and the like and sensitivity of skin to ultraviolet radiation have been input to store therein, and when an accumulative total of measured data of ultraviolet radiation dose has reached a specified value determined based upon the input SPF values and skin sensitivity, an alarm sound is generated warning of an excessive sunburn.

In this kind of device, however, the skin sensitivity to ultraviolet radiation is specified for the person who uses the device, so that once the skin sensitivity is set to the device, resetting of the skin sensitivity is not needed thereafter, but in case that sun creams or sun oils having different SPF values are used, an extremely troublesome resetting of the SPF values is needed at each time of application of other sun creams or sun oils having different SPF values. Meanwhile, once a SPF value is set to the device, the device generates an alarm warning the user of an excessive sunburn in accordance with a radiation dose specified based on the set SPF value.

Accordingly, there has been another disadvantage that it is inconvenient to use the same and one device among those who apply sun oils and the like of different SPF values.

Taking the purpose of the usage of the device into consideration, it is supposed that the user will take out the device to use it outside. Accordingly it is preferable that the device be made compact in size and light in weight and therefore most of the devices are driven by a battery. Hence, after measuring of ultraviolet radiation, it is necessary to switch the device to its non-measuring mode so as to prevent battery consumption, and if the device is left switched to the measuring mode, the battery is exhausted in vain, resulting in that the device cannot be used when necessary. This is the other disadvantage.

SUMMARY OF THE INVENTION

The present invention has been made in the light of the above mentioned situations and the object thereof is to provide a device used to prevent sunburns, which device generates an alarm warning of sunburns, only by inputting data corresponding to sensitivity of human skin to ultraviolet radiation.

It is another object of the present invention to provide a sunburn-preventing device which is convenient to carry and does not waste battery power uselessly.

To achieve these objects, the present invention is constructed as follows:

A device for use to prevent skin from sunburns includes input means for inputting skin-type data representing skin-sensitivity to ultraviolet radiation; sunburn data setting means for obtaining data of ultraviolet radiation doses causing sunburns and corresponding to different Sun Protection Factor values (SPF values) on the basis of the skin-type data inputted by said input means; ultraviolet-radiation measuring means for measuring ultraviolet radiation doses; accumulative ultraviolet-radiation dose memory means for storing accumulative data of the ultraviolet radiation doses measured by said ultraviolet-radiation measuring means; and alarming means for activating an alarm when the accumulative data stored in said accumulative ultraviolet-radiation dose memory means coincides with the ultraviolet radiation doses obtained by said sunburn-data setting means, respectively, said radiation doses causing sunburns and corresponding to SPF values.

As constructed as mentioned above, the device according to the present invention is easy in its manipulation, because inputting of SPF values into the device is not needed every time sun creams and the like of different SPF values are used. Since the device gives warning of ultraviolet radiation doses which cause sunburns and are specified by various SPF values, those who apply sun creams and the like of various SPF values can use in common the one and same sunburn-preventing device.

BRIEF DESCRIPTION OF THE DRAWINGS

FIGS. 4A through 4C are views illustrating display examples; and

FIG. 5 is a view illustrating a circuit arrangement of another embodiment of the present invention.

DETAILED DESCRIPTION OF THE PREFERRED EMBODIMENT

Figure 1:
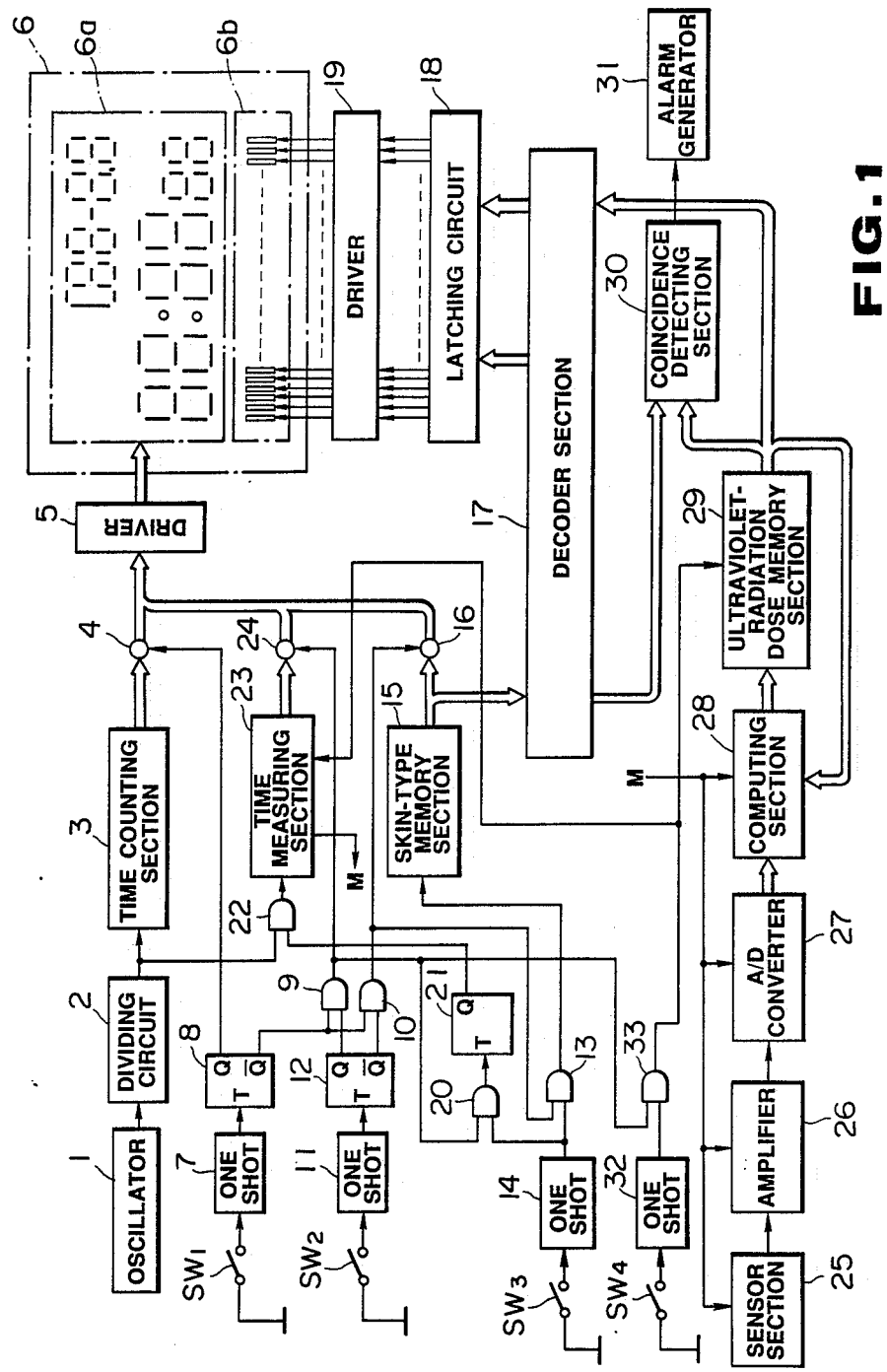
FIG. 1 is a view illustrating a circuit arrangement of whole construction of one embodiment of a device used to prevent sunburns according to the present invention.

FIG. 1 is a block diagram illustrating a whole construction of a wrist watch in which is installed a sunburn-protecting device according to the present invention. An oscillator 1 generates a clock signal having a fundamental frequency of 32.768 KHZ to output to a dividing circuit 2. The dividing circuit 2 divides the received clock signal to produce a time counting signal having a one second period and outputs the time counting signal to a time-counting section 3 and to an AND gate 22. The time-counting section 3 is provided with counters of hour, minute, second, day of the week, and data, and counts the time-counting signal to obtain the present time data. The time-counting section 3 outputs the present time data through a gate circuit 4 to a driver circuit 5. The driver circuit 5 produces a display signal from the present time data in order to display the signal on a time display section 6a of a display device 6. The display device 6 comprises the time-display section 6a and an ultraviolet-radiation dose display section 6b. The time-display section 6a displays the present time such as "day of the week, date, hour, minute, second", types of skin, and a measuring time of ultraviolet radiation. The display section 6b has 30 units of analogue display members to display warning levels of sunburns for various SPF values (ultraviolet radiation doses which cause sunburns to a certain degree), and the accumulative dose of ultraviolet radiation. One of the display members of the display section 6b corresponds to ultraviolet-radiation dose "1" (7J/cm$^2$) shown in Table 2. In case of an ultraviolet-radiation dose causing a sunburn, specified by the type of skin and the SPF value is given by "6" in Table 2, the sixth display member from the top lights to indicate the warning level.

A switch SW1 serves to set a time-display mode or an ultraviolet-radiation measuring mode. Every time the switch SW1 is operated, one shot circuit 7 outputs a pulse signal to a T input terminal of a flip-flip circuit 8 to invert the output of the flip-flop circuit 8.

When a Q output signal of the flip-flop circuit 8 is brought to a high level by operation of the switch SW1, the device is set to the time display mode. In the time-display mode, the gate circuit 4 is opened by the Q output signal of the flip-flop circuit 8 to transmit the time data from the time-counting section 3 to the driver circuit 5 and then the present time is displayed on the time-display section 6a of the display device. One example of a display is shown in FIG. 4A.

Under this condition of the operation, when the switch SW1 is operated, the Q output signal of the flip-flop circuit 8 goes low and the $\overline{Q}$ output signal thereof goes high, and this causes either of AND gate 9 or 10 to be opened and thereby the device is set to an ultraviolet mode. In the ultraviolet mode, a switch SW2 serves to select a setting mode of skin type or an ultraviolet-radiation measuring mode. Every time the switch SW2 is operated, one shot circuit 11 supplies a pulse signal to a T input terminal of a flip-flop circuit 12 to invert the output thereof.

When a $\overline{Q}$ output signal of the flip-flop circuit 12 is brought to a high level by operation of the switch SW2, the device is set to the data setting mode. At this time, two input signals to an AND gate 10 are high and thereby an output signal therefrom goes high. This high level output signal of the AND gate 10 causes an AND gate 13 to be opened to transmit a pulse signal of one shot circuit 14 generated by operation of a switch SW3 to a skin-type memory section 15 which comprises a divided-by-6 counter. That is, in the data-setting mode, the switch SW3 serves to set a skin type. A pulse signal generated from the one shot circuit 14 every time the switch SW3 is operated is counted by the skin-type memory section 15, which outputs either of codes "0" to "5" corresponding to the six types of skin. This code is decoded by a decoder section 17 and also is input through a gate circuit 16 to the driver 5. The decoder section 17 decodes the received codes and outputs to a latching circuit 18 and a coincidence detecting circuit 30 ultraviolet radiation dose data causing sunburns corresponding to SPF value, specified depending on the set skin types. The ultraviolet-radiation dose data latched in the latching circuit 18 is output as a lighting signal through a driver circuit 19 to the associated display member of the ultraviolet-radiation dose display section 6b, and thereby the ultraviolet-radiation dose causing sunburns specified by SPF values is indicated. FIG. 4B illustrates one example of the display plane when the skin type "2" is set. At the time-display section 6a on the display plane is displayed "TYPE 2" indicating the skin type, and the second, third, and sixth display members b2, b3, b6 of the ultraviolet-radiation dose display section 6b light to indicate that the ultraviolet-radiation dose causing sunburns of SPF values is given by indexes "2", "3", and "6".

After setting skin type in this manner, when the switch SW2 is operated, the Q output signal of the flip-flop circuit 12 is inverted to high and thereby the device is switched from the skin-type setting mode to the ultraviolet-radiation measuring mode. When the Q output signal of the flip-flop circuit 12 is high, the AND gate circuit 9 receives two high input signals and outputs a signal of a high level, and an input signal to an AND gate circuit 20 is high. Under this condition of the operation, the switch SW3 serves as a start/stop switch of ultraviolet-radiation measurement. The operation of the start/stop switch SW3 starts or stops the ultraviolet-radiation measurement.

That is, the one shot circuit 14 outputs a high level signal by operation of the switch SW3. This high level signal is transmitted through the AND gate circuit 20 to the flip-flop circuit 21, thereby causing the Q output signal to go high. When the Q output signal of the flip-flop circuit 21 goes high, the AND gate circuit 22 is opened to transmit the time-counting signal from the dividing circuit 2 to a time-measuring section 23 and then counting of the measuring time is started. The time-measuring section 23 comprises a counter capable of counting of 12 hours. The measuring time counted by the time-measuring section 23 is output to a driver circuit 25 through the gate circuit 24, the gate of which circuit 24 has been brought to open by the output of an AND gate circuit 9, thereby being displayed as the measuring time of ultraviolet radiation on the time-display section 6a. Once the measurement is started, the time-measuring section 23 outputs a minute signal M as a count-timing signal to a sensor section 25, an amplifier 26, A/D converter 27, and a computing section 28 to activate these circuits. The minute signal M is obtained every minute by counting the time counting signal. The sensor section 25 serves as a sensor to detect ultraviolet radiation and outputs the detected data to the amplifier 26 every time the sensor 25 receives the count-timing signal M. The amplifier 26 amplifies the detected signal to a predetermined level to output to an analogue to digital converter section (A/D converter section) 27. The A/D converter section 27 converts the received signal to a digital ultraviolet-radiation data to output to the computing section 28. The computing section 28 obtains ultraviolet-radiation dose data of one minute duration of measuring interval by multiplying the ultraviolet-radiation data obtained every count timing by 60 and then adds the data of ultraviolet-radiation dose accumulated during the period from the start of the measurement to the present time to the obtained ultraviolet-radiation dose data, thereby further obtaining other accumulative ultraviolet-radiation dose data. The other accumulative ultraviolet-radiation dose data is output to an ultraviolet-radiation dose memory section 29 and further to the decoder section 17 to be decoded. Thus decoded data is output to the latching circuit 18 and further to the driver circuit 19 to display the measured ultraviolet-radiation dose on the ultraviolet-radiation dose display section 6b. The accumulative ultraviolet-radiation dose data is output from the ultraviolet-radiation dose memory section 29 to the coincidence-detecting section 30 and is compared with the ultraviolet-radiation dose (alarm level) causing certain sunburns corresponding to SPF values at the coincidence detecting section 30, which ultraviolet-radiation dose is supplied from the decoder section 17 to the coincidence-detecting section 30. Deciding that the measured ultraviolet-radiation dose coincides with either of the alarm levels, the coincidence-detecting section 30 outputs a coincidence signal to an alarm-generator section 31. At this time, the alarm-generator section 31 generates an alarm warning the user that the user has received the ultraviolet radiation dose predetermined in accordance with certain SPF values.

During the measurement of ultraviolet radiation, if the switch is operated, the measurement is stopped. That is, the Q output signal of the flip-flop circuit 21 goes low, and the AND gate circuit 22 is closed. Then no time counting signal is supplied to the time-measuring section 23, and thereby the section 23 stops its time measurement. As the result, the time-measuring section 23 does not output the count-timing signal M of one minute period, thereby causing the sensor section 25 and the computing section 28 to cease their measurement of ultraviolet-radiation.

A switch SW4 serves to reset the measuring time and the accumulative ultraviolet-radiation dose to zero or "0". When the switch SW4 is operated in the ultraviolet-radiation measuring mode, a pulse signal generated by one shot circuit 32 is supplied through an AND gate circuit 33 opened by the AND gate circuit 9 to the time-measuring section 23 and the ultraviolet-radiation dose memory 29, thereby setting these circuits to the initial condition. FIG. 4c illustrates a display in the ultraviolet-radiation measuring mode. As mentioned above, FIG. 4b is a view illustrating that a plurality of display members, b2, b3, and b6 of the ultraviolet-radiation dose display section 6b light to indicate alarm levels which cause sunburns and are determined by SPF values with respect to the skin of type "2". The measurement of ultraviolet radiation starts with the above mentioned display state, and at present the display members b1 through b4 light continuously as shown in FIG. 4c, thereby indicating that the ultraviolet-radiation dose which has been received is expressed by "4". In this case, when measured ultraviolet-radiation dose has reached those corresponding to indications b2, and b3, alarm sounds have been generated.

Figure 2:
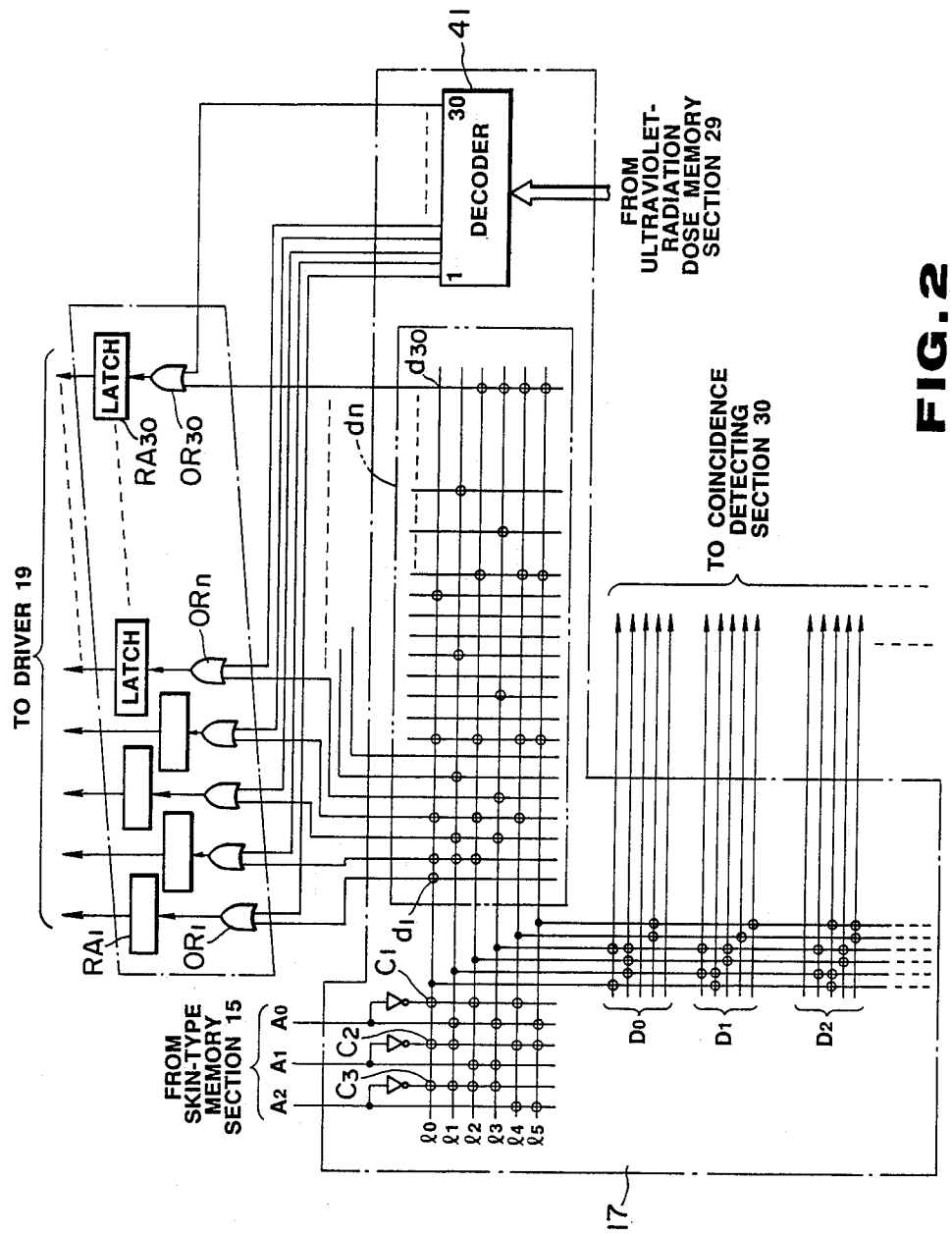
FIG. 2 is a view illustrating in detail a circuit arrangement of a decoder and a latching circuit shown in FIG. 1.

FIG. 2 is a block diagram illustrating functions of the decoder circuit 17 and the latching circuit 18. Crossing points dn of a lattice, arranged in 6 columns and 30 rows in the decoder section 17 indicate signal levels to be input to OR gate circuits $OR_1$ through $OR_{30}$ in the latching circuit 18, respectively. Crossing points with a round mark indicate signals of a high level and crossing points with no round mark indicate signals of a low level. Input signals $A_0$ to $A_2$ are supplied from the skin-type memory section 15 to indicate skin types. For example, the skin type "1" is designated by a combination of the input signals, "$A_2$, $A_1$, $A_0$", expressed as "0, 0, 0". That is, all the crossing points $C_1$, $c_2$, $c_3$ on a line $l_0$ go high and signals at the crossing points do through $d_{30}$ on the line $l_0$ are output to OR gate circuits, $OR_1$ through $OR_{30}$. As the result, latching circuits $RA_1$ through $RA_{30}$ of the decoder 17 output signals to light the display members, "$b_1$, $b_2$, $b_4$, $b_8$, and $b_{15}$" corresponding to ultraviolet-radiation dose, "1, 2, 4, 8 and 15" which cause sunburns to type I skin and are specified by SPF values, as indicated in Table 2. In the same manner, in case that type II skin is designated, the signals "$A_2$, $A_1$, $A_0$" supplied from the skin-type memory section 15 are expressed by a combination of "0, 0, 1", and signals indicated at each crossing point on a line $l_1$ are supplied to the latching circuits $RA_1$ through $RA_{30}$. Then, the display members "$b_2$, $b_3$, $b_6$, $b_{12}$, $b_{23}$" corresponding to levels "2, 3, 6, 12, 23" given in Table 2 light to indicate ultraviolet-radiation dose causing sunburns and specified by SPF values. The accumulative ultraviolet-radiation dose is supplied from the ultraviolet-radiation dose memory section 29 to the decoder 41. The decoder 41 converts the supplied data to a display signal for indicating the accumulative ultraviolet-radiation dose in order to output the converted display signal to OR gate circuits $OR_1$ through $OR_{30}$ of the latching circuit 18. That is, the signal for indicating ultraviolet-radiation dose causing a sunburn and specified by the SPF value to the designated skin type and the signals indicating the measured accumulative ultraviolet-radiation doses are supplied to the OR gate circuits $OR_1$ through $OR_{30}$ of the latching circuit 18. The latching circuits $RA_1$ through $RA_{30}$ latch and output these signals to the driver circuit 19. As the result, both the ultraviolet-radiation doses causing sunburns and defined by the SPF values and the measured ultraviolet-radiation doses are indicated on the ultraviolet-radiation dose display section 6b, so that the user of the device can recognize how many margins of ultraviolet-radiation dose is allowed to the user until he receives the ultraviolet-radiation dose causing the sunburn and specified by the SPF value of the sunscreen and the like which the user applies to her or his skin. The decoder section 17 converts the ultraviolet-radiation doses causing sunburns and specified by five SPF values with respect to the selected type of skin into data, $D_0$ through $D_4$ comprising 5 bits, in conformity with the data format which is output from the ultraviolet-radiation dose memory section 29 to the coincidence-detecting section 30. The above data $D_0$ through $D_4$ are supplied to the coincidence-detecting section 30, which compares the supplied data and the measured ultraviolet-radiation dose.

Figure 3:
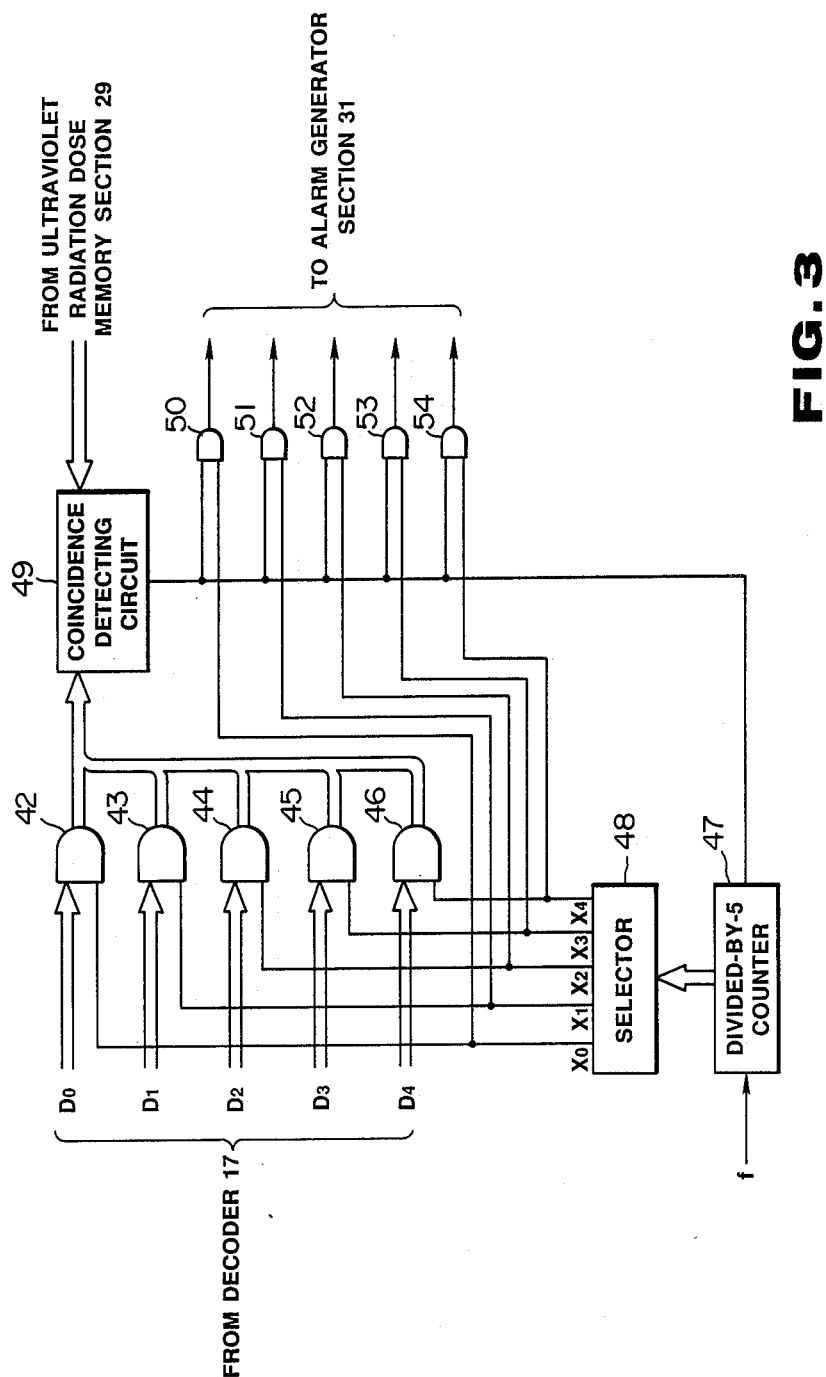
FIG. 3 is a view illustrating a concrete circuit of a coincidence detecting section shown in FIG. 1.

FIG. 3 is a block diagram showing a concrete arrangement of the coincidence detecting section 30. The data, $D_0$ through $D_4$ are supplied to AND gate circuits 42 through 46, respectively and outputs of a selector circuit 48 are input to other input terminals of the AND gate circuits 42 through 46. A divide by 5 counter 47 counts a signal f of a certain frequency supplied from the dividing circuit 2 (not shown in FIG. 3) and makes an increment sequentially, and outputs count value "0 through 4" to the selector circuit 48. The selector circuit 48 comprises a decoder circuit which selects in a time division fashion the data $D_0$ through $D_4$ input to the AND gates 42 through 46 and corresponding to five SPF values and then outputs the selected data to a coincidence-detecting circuit 49. That is, the selector circuit 48 outputs signals in response to the count values from the divided-by-5 counter 47, which signals make the output terminals $X_0$ through $X_4$ of the selector circuit 48 high sequentially in a time division fashion, thereby sequentially opening the AND gate circuits 42 through 46 to transmit one of the data $D_0$ through $D_4$ to the coincidence-detecting circuit 49. As the result, the coincidence-detecting circuit 49 compares sequentially the ultraviolet-radiation doses causing sunburns and specified by the SPF values and the accumulated ultraviolet-radiation dose input from the ultraviolet-radiation dose memory section 29, and outputs coincidence signals to AND gate circuits 50 through 54, when the detecting circuit 49 detects that both the compared radiation dose coincide with each other. To the other input terminals of the AND gate circuits 50 through 54 is input the output signals of the selector circuit 48, and only the AND gate circuit corresponding to the SPF value selected by the selector circuit 48 is opened to transmit the coincidence signal. Accordingly, the alarm-generator section 31 discriminates five kinds of the coincidence signals to generate five different alarm sounds warning that the ultraviolet-radiation dose corresponding to which SPF value has been received by the time of alarm generation.

In the above mentioned embodiment, the ultraviolet-radiation doses causing sunburns and specified by the SPF values and the measured ultraviolet-radiation doses are indicated by lighting of the corresponding display members, but, for example, a partially modified embodiment of the device used for preventing sunburn shown in FIG. 1 is illustrated in FIG. 5. In the modified embodiment, an AND gate circuit 60 and a carry signal 1P/12H are added to the circuit arrangement of FIG. 1. In the device shown in FIG. 1, the Q output signal of the flip-flop circuit 21 is high and opens the AND gate circuit 22. Hence the measurement of ultraviolet radiation is performed every minute, while the time-measuring section 23 is counting the time-counting signal supplied from the dividing circuit 2. Accordingly, even if the user of the device does not bask in ultraviolet radiation during day-time, the time measuring section 23 continues its measuring operation as long as the measurement of the device is not stopped, thereby resulting in consumption of the power in vain.

Therefor, in the embodiment shown in FIG. 5, the time-measuring section 23 is arranged to output the signal M of every one minute through the AND gate circuit 60, to the other terminal of which the Q output signal of the flip-flop circuit 21 is supplied, to the sensor section 25, the amplifier 26, the computing section 28, and ultraviolet-radiation dose memory section 29. When twelve hours have past after the start of the time measurement of the time-measuring section 23, the time-measuring section 23 outputs a carry signal 1P/12H to a reset terminal R of the flip-flop circuit 21, thereby causing the Q output signal of the flip-flop circuit 21 to go low. Accordingly, when twelve hours have past after the start of the time measurement, the AND gate circuit 22 outputs no time counting signal, causing the signal M to cease, and thereby the measurement of ultraviolet-radiation dose is automatically stopped, saving the power consumption.

In the embodiment of FIG. 5, when the measured twelve hours lapse, the time measuring section 23 makes the measurement of ultraviolet-radiation dose stop, but the device can be designed such that the measurement of the radiation dose is stopped at the lapse of six hours or ten hours instead of twelve hours.

Furthermore, in the embodiments, the measurement of radiation dose is made to stop by the signal delivered from the time-measuring section 23, but it is possible that when the time-counting section 3 recognizes a certain value, for example, 6 o'clock p.m. or twelve midnight, the signal of the time-counting section 3 is delivered to the reset terminal R of the flip-flop circuit 21, thereby causing the measurement of radiation dose to stop.

In the above mentioned embodiments, the ultraviolet radiation doses causing sunburns and defined by the SPF values and the measured radiation doses are indicated by lighting the corresponding display members in an analogue fashion, but, for example, these radiation doses may be indicated by flashing the display members corresponding to the SPF values at different flashing rates depending on the radiation doses to be indicated. In this case, it will be easy to discriminate between the display of the measured radiation dose and the display of the radiation doses corresponding to SPF values. And when the measured radiation dose has reached an alarm level (ultraviolet radiation dose which causes a sunburn) specified by SPF value, the lighting display may be switched to a flashing display, and thereby it can be definitely recognized whether or not the measured radiation dose has reached the alarm level, even when the former has approached the later.

The display of the ultraviolet-radiation dose is not limited to the display method which indicates the radiation dose level in an analogue fashion as employed in the above mentioned embodiments, but the ultraviolet-radiation doses may be displayed by pictures, figures, or by digits.

Though the above embodiments give an example in which the sunburn-preventing device is installed in a wrist watch, the device may be installed in other equipment such as a compact electronic calculator, or the device may be designed for an exclusive use.

What is claimed is:

1. A device for use to prevent skin from sunburns, comprising:
    input means for inputting data corresponding to a selected one of a plurality of skin-types representing skin-sensitivity to ultraviolet radiation;
    sunburn-data setting means for obtaining data of ultraviolet radiation doses causing sunburns and corresponding to a plurality of different Sun Protection Factor values (SPF values) on the basis of the selected skin-type data inputted by said input means;
    ultraviolet-radiation measuring means for measuring ultraviolet radiation doses;
    accumulative ultraviolet-radiation doses memory means for storing accumulative data of the ultraviolet radiation doses measured by said ultraviolet-radiation measuring means; and
    alarming means for activating an alarm when the accumulative data stored in said accumulative ultraviolet-radiation dose memory means coincides with each of different ultraviolet radiation doses corresponding to a plurality of SPF values, said different ultraviolet radiation doses being obtained by said sunburn-data setting means.

2. A device as defined in claim 1 wherein said input means inputs data corresponding to at least any one of six skin types corresponding to skin-sensitivities.

3. A device as defined in claim 1 wherein said sunburn-data setting means obtains at least ultraviolet-radiation dose data corresponding to SPF values 2, 4, 8, with respect to data of one skin-type input by said input means.

4. A device as defined in claim 1 wherein said sunburn data setting means comprises a decode circuit for decoding said inputted skin-type data to obtain data of ultraviolet radiation doses causing sunburns.

5. A device as defined in claim 1 wherein said ultraviolet-radiation measuring means measures ultraviolet radiation at a predetermined time interval.

6. A device as defined in claim 1, further comprising:
    display means for displaying the accumulative data stored in said accumulative ultraviolet-radiation dose memory means.

7. A device as defined in claim 6 wherein said display means comprises an analogue display means having a plurality of display members.

8. A device for use to protect skin from sunburns, comprising:
    input means for inputting data corresponding to a selected one of a plurality of skin types, each type representing skin-sensitivity to ultraviolet radiation;
    sunburn-data setting means for obtaining data of ultraviolet radiation doses causing sunburns and corresponding to different Sun Protection Factor values (SPF values) on the basis of a selected skin-type inputted by said input means;
    operation-switch means for outputting a start and/or stop instruction signal;
    time-measuring means for starting a time measurement on the basis of the start and/or stop instruction signal supplied from said operation-switch means;
    accumulative ultraviolet-radiation dose memory means for storing accumulative data of the ultraviolet radiation doses accumulated during the time measurement executed by said time-measuring means;
    alarming means for activating an alarm at each time when the accumulated data stored in said accumulative ultraviolet-radiation dose memory means coincides with each of different ultraviolet radiation doses causing sunburns and corresponding to the different SPF values, said different doses causing sunburns being obtained by said sunburn-data setting means; and
    measurement stopping means for making said time-measurement means stop its measuring of time at a predetermined time.

9. A device as defined in claim 8 wherein said measurement stopping means makes said time-measurement means stop its measuring of time when the time measured by said time-measurement means has reached a predetermined time.

10. A device as defined in claim 8 further comprising:

display means for displaying the time measured by said time-measurement means.

11. A device as defined in claim 8 wherein said input means inputs data corresponding to at least any one of six skin types corresponding to skin-sensitivities.

12. A device as defined in claim 8 wherein said sunburn data setting means obtains data of ultraviolet-radiation doses causing sunburns and corresponding at least to SPF values, 2, 4, 8.

13. A device as defined in claim 8 wherein said sunburn data setting means comprises a decode circuit for decoding the inputted skin-type data to obtain data of ultraviolet radiation doses causing sunburns.

14. A device as defined in claim 8 wherein said ultraviolet-radiation measuring means measures ultraviolet radiation at a predetermined time interval.

15. A device as defined in claim 8, further comprising:
display means for displaying the accumulative data stored in said accumulative ultraviolet-radiation dose memory means.

16. A device for use to prevent skin from sunburns, comprising:
input means for inputting data corresponding to a selected one of a plurality of skin-types representing skin-sensitivity to ultraviolet radiation;
sunburn-data setting means for obtaining data of ultraviolet radiation doses causing sunburns and corresponding to a plurality of different Sun Protection Factor values (SPF values) on the basis of the selected skin-type data inputted by said input means;
analogue display means having a plurality of display members, each of which display members displays different data of ultraviolet radiation doses, respectively;
first display control means for causing the corresponding display member of said analogue display means to display at the same time a plurality of different data of ultraviolet radiation doses obtained by said sunburn-data setting means, said doses causing sunburns and corresponding to the SPF values;
ultraviolet-radiation measuring means for measuring an ultraviolet radiation dose;
accumulative ultraviolet-radiation dose memory means for storing accumulative data of the ultraviolet-radiation doses measured by said ultraviolet-radiation measuring means; and
second display control means for causing said analogue display means to display the accumulative data stored in said accumulative ultraviolet-radiation dose memory means.

17. A device as defined in claim 16 wherein said input means inputs data corresponding to at least any one of six skin-types corresponding to skin-sensitivities.

18. A device as defined in claim 16 wherein said sunburn data setting means obtains data of ultraviolet-radiation doses causing sunburns and corresponding at least to SPF values, 2, 4, 8.

19. A device as defined in claim 16 wherein said sunburn data setting means comprises a decode circuit for decoding said inputted skin-type data to obtain data of ultraviolet radiation doses causing sunburns.

20. A device as defined in claim 16 wherein said ultraviolet-radiation measuring means measures ultraviolet radiation at a predetermined time interval.

* * * * *